March 1, 1966     J. N. SCHUMACHER     3,237,311
AMPLIFYING DEVICES

Filed Oct. 8, 1963     2 Sheets-Sheet 1

INVENTOR
John N. Schumacher
BY John Mahoney
ATTORNEY

March 1, 1966  J. N. SCHUMACHER  3,237,311
AMPLIFYING DEVICES
Filed Oct. 8, 1963  2 Sheets-Sheet 2

INVENTOR
John N. Schumacher
BY John Mahoney
ATTORNEY

United States Patent Office 3,237,311
Patented Mar. 1, 1966

3,237,311
AMPLIFYING DEVICES
John N. Schumacher, Cleveland, Ohio, assignor of fifty percent to Dan W. Duffy, Cleveland, Ohio
Filed Oct. 8, 1963, Ser. No. 314,751
7 Claims. (Cl. 33—172)

My invention relates to improved means for amplifying a comparatively small movement of an element of a device to provide means that may be readily seen and measured. More particularly, it relates to a comparator including hydraulic means for amplifying the movement of an element when an article having a dimension which is to be measured is moved into engagement with the element to determine whether the article has the same dimension or a dimension which falls within a predetermined degree of tolerance of one or more guage blocks or a standard article so that articles having the desired dimensions may be selected for use and those whose dimensions do not fall within a predetermined degree of tolerance may be rejected.

Various means have heretofore been provided to amplify the movement of an indicator point for various purposes, such as for determining the roughness of a surface or for comparing a dimension of an article which is to be measured. For instance, in dial indicators, a small gear rack is moved by an indicator point through one or more small gears to rotate a shaft having a pointer on one end thereof to move the pointer over a graduated scale to thereby amplify the movement of the indicator point or the movement of the indicator point may tilt a small mirror to reflect a beam of light inside of a short sector of a cylinder composed of a translucent material. In the latter case, the reflected beam of light shows as a bright spot or line on the outside of the sector which is graduated to show the distance the light spot or line moves which is proportional to the angle the mirror is tilted by the indicator point. The movement of the indicator point may also be used to vary the resistance or impedance of an electrical circuit in which case the voltage or current in the circuit is amplified and then measured by a sensitive meter, the dial of which is graduated to show the distance the indicator point has been moved.

Dial indicators as heretofore used, however, are subject to friction and wear and are sensitive to shock. For instance, a sudden movement of the gear rack can break a bearing or bend or break a gear shaft or one or more gear teeth. For indicators in which the resistance or impedance of an electrical circuit is amplified, a source of electrical energy is of course necessary.

In accordance with the present invention, hydraulic means are provided to amplify the movement of an element, thereby eliminating all mechanical friction and the need of a source of electrical energy. My invention consists essentially of a liquid filled casing, one side of which is flexible and a portion of which communicates with a small transparent capillary tube which extends upwardly from the casing. Any inward movement of the flexible side of the casing displaces some of the liquid in the casing and causes it to rise in the tube, the distance it rises in the tube for any given inward movement of the flexible side of the casing being inversely proportional to the cross sectional area of the bore of the tube and the area of the flexible side of the casing. It is therefore apparent that by using a tube having a comparatively small bore, such as a capillary tube, a large casing is not necessary.

While in a broad sense my invention relates to means for hydraulically amplifying the movement of the flexible side of the casing by means of the liquid rising in a transparent capillary tube which may be used for any desired purpose, such as measuring the roughness of a surface of an object, it is particularly adapted to be utilized in comparators for comparing a dimension, such as the length, thickness or diameter of an article with one or more guage blocks or with a standard article having the desired dimensions.

It is therefore an object of the present invention to provide an improved device in which the movement of an element is amplified by hydraulic means.

Another object of my invention is to provide an amplifying device including a casing filled with a liquid and having a flexible side, a capillary tube communicating with the liquid in the casing and connected to one side of the casing and extending upwardly therefrom and in which the parts are so arranged that the distance the liquid rises in the capillary tube for any given distance the flexible side of the casing is moved inwardly will be in direct proportion to the area of the flexible side of the casing and the cross sectional area of the bore of the tube.

A still further object of my invention is to provide an improved comparator comprising as the principal part thereof a hydraulic amplifying device including a casing filled with a liquid and having a flexible diaphragm arranged in spaced relation to a work support and a capillary tube extending upwardly from the casing so that upon inserting an article between a contact extending from the flexible diaphragm and the work support, inward movement of the flexible diaphragm will be amplified by liquid moving upwardly in the bore of the tube.

My invention will be better understood by reference to the accompanying drawings in which.

Figure 1:
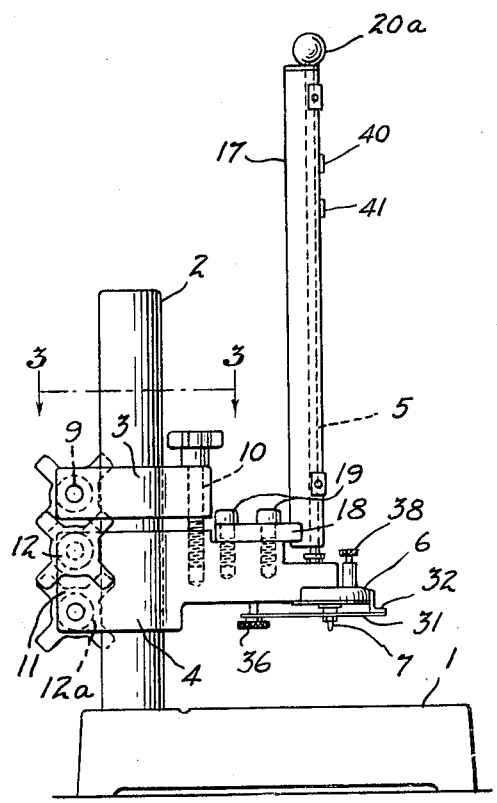
FIG. 1 is a side elevational view of one form of an amplifying device.
Figure 2:
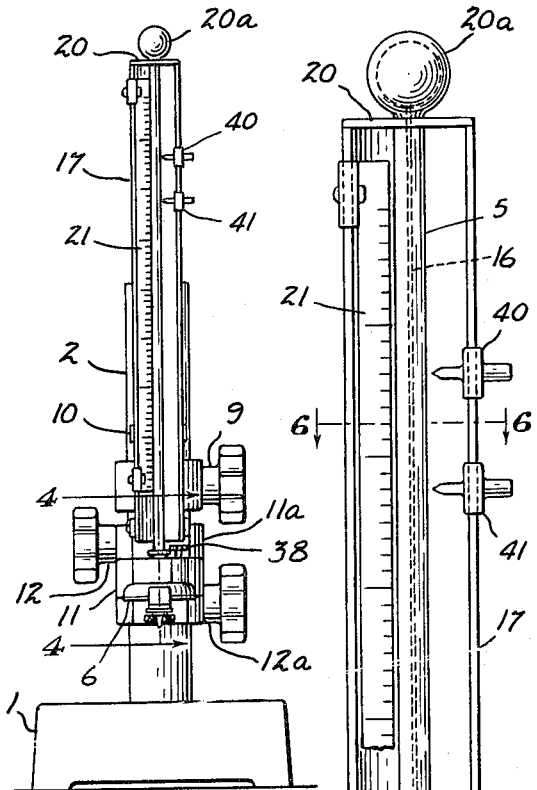
FIG. 2 is an end elevational view of the amplifying device shown in FIG. 1.
Figure 5:
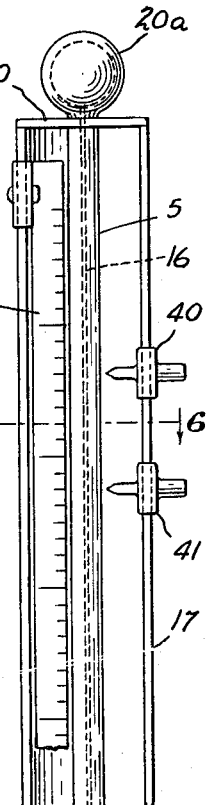
FIG. 5 is an enlarged elevational view of the capillary tube and a shield for the tube having a calibrated scale and a pair of movable clips thereon.

While my improved means for amplifying the small movement of an element may be used for precision measurement in various devices, such as in devices for measuring the roughness of a surface, as illustrated, it is shown as constituting part of a comparator which may be used to compare a dimension of an article with the corresponding dimension of a standard article which has been constructed to the desired dimensions by suitable means, such as guage blocks.

As shown in FIGS. 1 to 6 of the drawings, my improved comparator includes a base, abutment or work support 1, the top portion of which is finished flat and smooth, a standard 2 having its lower portion secured perpendicular to the base, abutment, or work support in any desired manner, such as by welding or brazing or as shown by inserting it into an aperture in abutment 2 with a press or shrink fit to provide a rigid structure. Brackets 3 and 4 are also provided which are adjustably mounted on standard 2 and my improved amplifying means consisting of a capillary tube 5 and a casing designated generally by the numeral 6 are secured to bracket 4 by suitable means, such as soldering or brazing.

Figure 3:
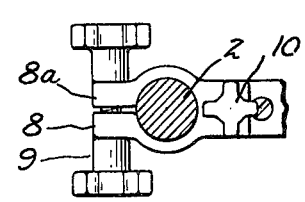
FIG. 3 is a cross sectional view taken with parts broken away on a plane passing through the line 3—3 of FIG. 1, looking in the direction of the arrows.
Figure 6:
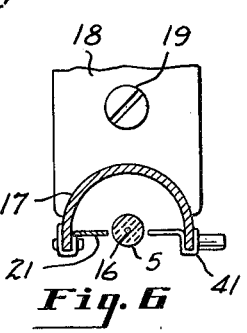
FIG. 6 is a cross sectional view taken on a plane passing through the line 6—6 of FIG. 5.

In accordance with my invention, means are provided to adjust bracket 4 to set casing 6 in a position in which a contact 7 secured to the lower portion of the casing is roughly in position to receive an article between the contact and the base abutment or work support 1. For this purpose a bracket 3 is bored to provide a sliding fit and standard 2 with one end slotted as shown in FIG. 3 to provide bifurcated arms 8 and 8a which extend outwardly from the standard and which may be forced under tension toward each other by a screw 9 having a smooth portion extending through arm 8 and a portion threaded into arm 8a. It will of course be apparent that when screw 9 is threaded outwardly the tension of arms 8 and 8a is released so that bracket 3 may be adjusted on standard 2 and when threaded in the opposite direction screw 9 forces arrms 8 and 8a toward each other under tension to hold bracket 3 in a predetermined position on standard 2.

Bracket 4 is also bored to provide a sliding fit on standard 2 and is adjustable away and toward bracket 3 by suitable means, such as a screw 10 having a smooth portion extending through bracket 3 and a portion threaded into an aperture in bracket 4. Screw 10 has a head extending above bracket 3 for turning screw 10 in one direction to raise bracket 4 to a position in which it approaches bracket 3 or it may be adjusted to a position in which the contact point 7 is approximately in a position to receive an article between the lower portion and the base abutment or work support 1. When bracket 4 is adjusted to the desired position, suitable means are provided to set it in that position. For this purpose, the bored portion of bracket 4 terminates in a pair of extensions 11 and 11a somewhat similar to those shown in FIG. 3 and upper and lower threaded screws 12 and 12a which are similar to screw 9 are provided for forcing the extensions of bracket 4 under tension toward each other to hold bracket 4 firmly in place on standard 2 when screws 12 and 12a are threaded inwardly which tension is released when the screws are threaded in the opposite direction. As shown, screw 12 has a portion extending through extension 11 and is threaded into extension 11a and screw 12a has a smooth portion extending through extension 11a and is threaded into extension 11.

In accordance with my invention, the casing 6 incloses a chamber 13 which is filled with a liquid and while the liquid may be of any desired type, a light liquid, such as alcohol, is preferably utilized which may be colored by a soluble dye to accentuate its visibility. The bottom of the casing 6 is closed by a flexible diaphragm 14 which may be formed of a suitable material, such as metal, and the casing has an opening 15 in its top to provide communication between the chamber 13 and the bore 16 of the capillary tube 5. To protect tube 5 and to support its upper end, a shield 17 is provided which may have an inner reflective surface or which may be colored to contrast with the color of the liquid in the tube. Shield 17 may be supported on bracket 4 in any desirable manner. As shown, an arm 18 having one end secured to the lower portion of the shield has its other end secured to bracket 4 by suitable means, such as screws 19. To maintain the capillary tube 5 in the desired position washer 20 is fixed to the shield by suitable means, such as soldering or brazing, and is provided with an aperture through which the capillary tube extends, and if desired, a rubber or plastic grommet (not shown) may be inserted in the aperture in the washer through which the capillary tube extends, and to provide a space for air and vapors in the tube when liquid displaced from the casing rises therein, the tube is enlarged at its upper end as indicated by the numeral 20a. To enable the height to which the liquid rises in the capillary tube 5 to be readily determined, shield 17 may be provided with a graduated strip 21.

The bottom of the capillary tube 5 may be secured to the casing 6 with the bore 16 therein communicating with the chamber 13 in any desired manner. As shown, an annular housing 22 has an inwardly extending annular portion at its lower end which surrounds opening 15 and is integral with, or is soldered, brazed, or otherwise secured to casing 6. The upper end of housing 22 is internally threaded and means are provided to form a hermetic seal between the capillary tube and the housing and while any suitable means may be provided for this purpose, as shown, an O-ring 23 is interposed between washers 24 and 25 and may be compressed by bushing 26 threaded into the upper portion of the housing 22 and through the opening of which the capillary tube 5 extends to a position in which it rests upon the inwardly extending portion with its bore communicating with the aperture 15 in casing 6. When bushing 26 is threaded inwardly, it compresses O-ring 23 and forms a hermetic seal between the capillary tube and the casing 6. When bushing 26 is loosened, however, the pressure on O-ring 23 is released and the capillary tube may be removed from the housing and replaced by a capillary tube having the same outside diameter but a different size bore in which case the bushing 26 is again threaded inwardly to provide a hermetic seal between the capillary tube and the casing 6. A capillary tube with a different size bore would of course require a strip 21 calibrated to suit the capillary tube with which it is used.

As previously stated, the bottom portion of casing 6 is closed by a flexible diaphragm and to distribute upward pressure evenly over the movable portion of the flexible diaphragm, a tubular member 27 has a flange 28 secured to the diaphragm by suitable means, such as soldering or brazing, and an upwardly extending lug 29 which extends through an aperture in the diaphragm to limit upward movement of the diaphragm in the event that excessive upward pressure is exerted upon the lower portion of the contact point 7. Tubular member 27 is internally threaded to receive a threaded portion 30 of the contact 7 which as shown has a conically-shaped lower portion with a small radius. Contact point 7, however, may be removed and replaced by a contact shaped to conform to the article being guaged or measured.

Figure 4:
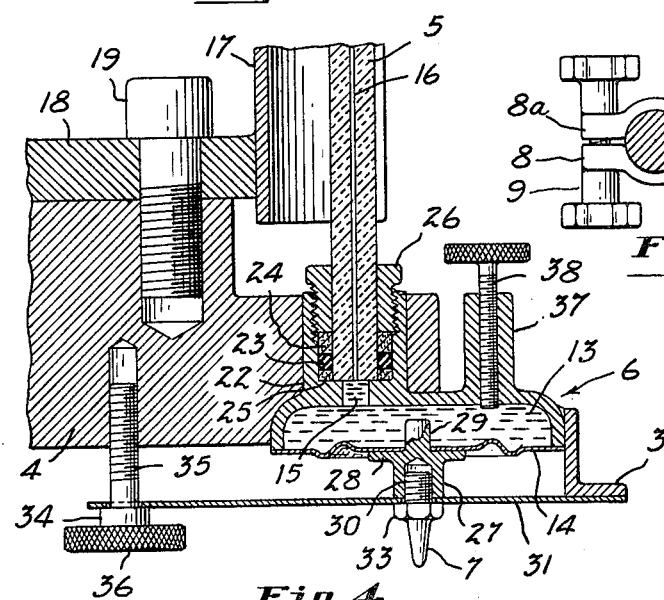
FIG. 4 is a cross sectional view taken on a plane passing through the line 4—4 of FIG. 2, looking in the direction of the arrows with parts broken away.

To adjust contact 7 so that it is substantially perpendicular to the base abutment or work support 1 and to prevent any side or angular movement of the contact point while it is being assembled in place, a resilient strip 31 has one end secured by suitable means, such as soldering or brazing to one arm 32 of an angle member, the other arm of which is secured in a similar manner to casing 6. Resilient strip 31 has an opening therein to receive the threaded portion of contact 7 and is secured by suitable means, such as soldering or brazing to the bottom edge of tubular member 27. A nut-shaped portion 33 on contact 7 also engages the lower portion of the resilient strip 31 when contact 7 is threaded inwardly. The other end of resilient strip 31 rests upon the shoulder 34 of a screw, the shank 35 of which extends loosely through an aperture in resilient strip 31 and is threaded into bracket 4. By turning the head 36 of the screw in a clockwise direction as shown in FIG. 4, it may be threaded into bracket 4 a sufficient extent to move contact 7 to a position in which it is perpendicular to the base, abutment or work support 1.

The casing 6 may be filled either through the housing or through a tubular member 37 which is closed by a screw 38. When the casing is filled through the housing 22, screw 38 may be threaded outwardly to a sufficient extent to permit the liquid to fill the opening 15 and to rise a short distance upwardly into tubular member 37. In a like manner, if the casing is filled through tube 37, sufficient liquid may be introduced into the casing to cause a portion of the liquid to rise into the aperture 15 before screw 38 is threaded inwardly to the position shown in FIG. 4.

When an article of the desired size which may be determined by usual means, such as one or more guage blocks, is inserted between contact 7 and the base, abutment, or work support 1, liquid from casing 6 rises upwardly through the bore of the capillary tube. In the event the liquid does not rise upwardly into the bore of the capillary tube to the desired height when a standard guaged article is inserted between the work support and the contact 7, screw 37 is threaded inwardly to a sufficient extent as shown in FIG. 4 to cause the liquid to rise to the desired level. On the other hand, if the liquid rises to an undesired height in the tube, screw 38 is threaded outwardly to allow some of the liquid to flow upwardly into the tubular member 37. When a standard article is inserted between the support 1 and the contact, screw 38 is so adjusted that sufficient liquid flows upwardly into the bore of the capillary tube to provide a top portion that is substantially midway between suitable markers, such as pointers extending inwardly from spaced clips 40 and 41 which are secured to one edge of shield 17 as shown more particularly in FIGS. 5 and 6. The clips 40 and 41 may be of course adjusted to the desired positions on the shield depending upon the liquid used, the size of the bore, and the amount of tolerance permitted in the articles being measured. If the dimensions of the article being measured causes the liquid to rise to a higher level in the tube than that designated by the pointer of clip 40, such article may be rejected as being above the desired size and if the article being measured does not cause the liquid to rise to the pointer of clip 41, it may be rejected as being undersize. Articles having dimensions which fall within a desired specification may therefore be readily and quickly determined.

Figure 7:
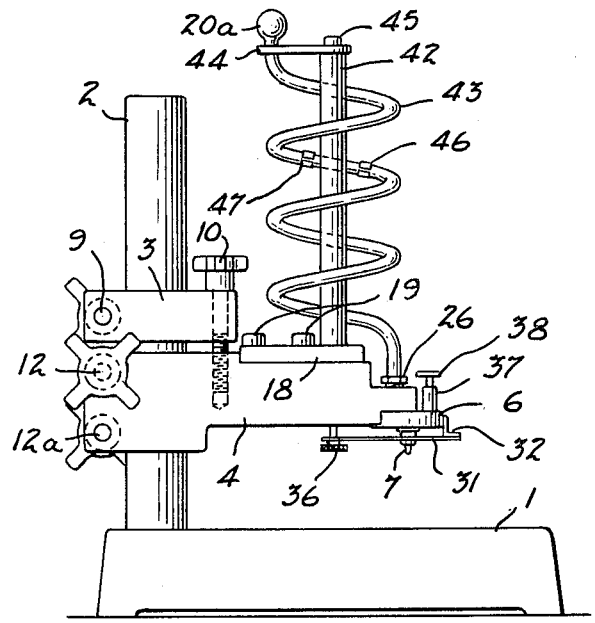
FIG. 7 is an elevational view of a modification of the amplifying device.
Figure 8:
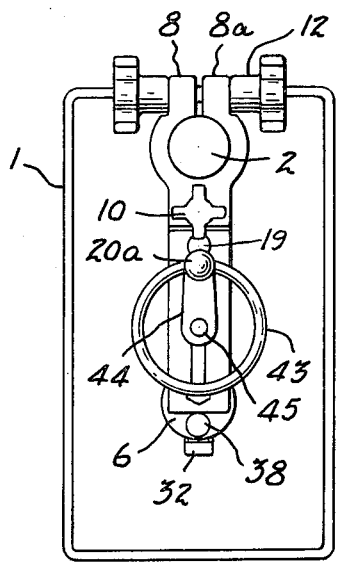
FIG. 8 is a plan view of the apparatus shown in FIG. 7.

A modification of my invention is shown in FIGS. 7 and 8 which is somewhat similar to that shown in FIGS. 1 to 6 and corresponding parts having accordingly been designated by the same reference numerals. In this modification, however, to increase the length of the capillary tube without increasing its height, a second standard 42 is provided and the capillary tube which is designated in this modification by the numeral 43 is in the form of a helix and means associated with the standard 42 are provided to hold the capillary tube in place. For this purpose, a metal strap 44 having one end secured to standard 42 by suitable means, such as screw 44, has a bifurcated end portion at its other end which extends around the tube 43 below the bulb 20a.

The lower end of capillary tube 43 extends through a housing as shown more particularly in FIG. 4 and its bore 16 is arranged in alignment with the opening 15 in casing 6. The comparator shown in FIGS. 7 and 8 is of course used in substantially the same manner as the comparator shown in FIGS. 1 to 6. In this modification, however, the capillary tube 43 is shown as being calibrated and narrow clips 46 and 47 which are slidable on the tube are provided to define the tolerance permitted in articles being measured. In this modification when an article guaged to provide the correct dimension is interposed between the contact 7 and the work support, liquid from casing 6 flows upwardly in the capillary tube. In such case if the top of the liquid in the capillary tube 43 does not rise to a point substantially midway between the clips 46 and 47, screw 38 is threaded inwardly to cause the liquid to rise in the capillary tube to the desired height and in the event the liquid rises above a point midway between clips 46 and 47, screw 38 is threaded outwardly to permit more liquid to flow upwardly in the tube 37 which lowers the head of the liquid in the capillary tube to the desired point. The corresponding dimension of other articles may then be interposed between contact 7 and the work support and if they cause the liquid to rise above clip 47, they are rejected as being oversize whereas if they do not cause the liquid to rise to a point in the capillary tube designed by the clip 46, they are rejected as being undersize.

Figure 9:
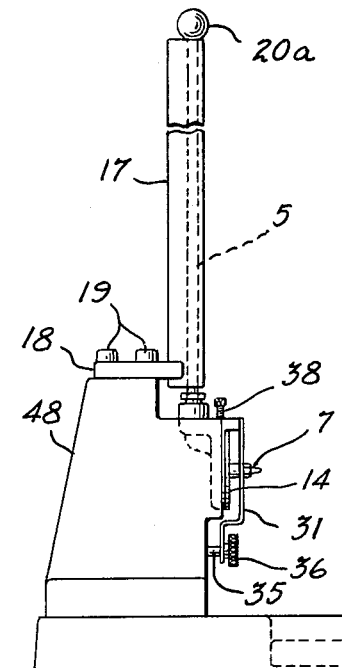
FIG. 9 is a side elevational view of another modification of my invention with parts shown in section.
Figure 10:
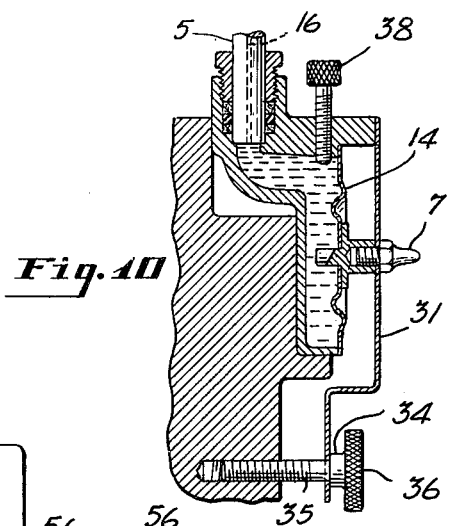
FIG. 10 is an enlarged detail sectional view of part of the amplifying device shown in FIG. 9.

Another modification of my invention is shown in FIGS. 9 and 10 which is somewhat similar to the apparatus shown in FIGS. 1 to 6 and corresponding parts have accordingly been designated by the same reference numerals. As shown in the drawings, a block 48 is provided which rests upon a foundation 49 and is arranged substantially opposite to an abutment 50 which consists of one arm of an angle member, the other arm 51 of which extends parallel to the foundation 49 and has a portion extending downwardly into and being slidable in a slot 52 in the foundation. Slot 52 is enlarged at its lower portion as indicated by the numeral 53 to provide a space for the heads 54 of bolts 55 which heads are slidable in the lower slot when nuts 56 therefor are loosened. It will of course be understood that when nuts 56 are tightened the abutment 50 is set in a fixed position. To enable the abutment to be moved by increments when nuts 56 are loosened, a block 57 having a portion extending downwardly into a slot 52 is held in a set position by a bolt 58 having its head 59 extending into the lower portion of the keyhole slot. Block 57 is held in place by a nut 60 on bolt 58 and suitable means are provided to move the abutment 50 toward contact 7 by small increments. As shown, when a screw 61 threaded through block 55 engages arm 51 it moves abutment 50 toward contact 7 and when screw 61 is threaded in the opposite direction, abutment may be moved by increments in the opposite direction away from contact 7. The other parts of the comparator are similar to those shown in FIGS. 1 to 6 and corresponding parts have been designated by the same reference numerals.

As shown more particularly in FIG. 10, the casing 13 is carried by block 48 and means similar to those shown in FIGS. 1 to 6 are provided to adjust contact 7 to a position in which it is perpendicular to abutment 50. In this modification, when a standard guaged article is placed between contact 7 and abutment 50 and nuts 56 are loosened, screw 61 is threaded to a position to move the abutment to approximately a position in which liquid flows upwardly in the capillary tube to a position substantially midway between the pointers on clips 40 and 41. Screws 56 are then tightened to maintain abutment 50 in a fixed position and final adjustment is made with the screw 38. The corresponding parts of other articles to be guaged may then be interposed between contact 7 and the abutment 50 and if they cause the liquid to rise in the capillary tube to a point above the pointer on clip 46, they are rejected as being oversize whereas if they do not cause the liquid to rise to a point designated by the pointer on clip 41, they are rejected as being undersize. Articles which cause the liquid to rise to a point between the pointers on clips 40 and 41 of course fall within the desired specification.

What is claimed is:

1. An amplifying device including an abutment, a bracket spaced from said abutment, a casing having a rigid portion secured to said bracket and a flexible outer wall which together form a chamber for a body of liquid and the rigid portion of said casing having an opening therein, a capillary tube communicating with said casing through said opening and extending upwardly therefrom, means for securing said tube in place, a tubular member having a flange secured to substantially the central portion of the flexible wall of said casing and extending outwardly therefrom, a support secured to one end of the casing, a resilient strip having one end portion secured to said support, a portion secured to the free end portion of said tubular member and having an opening therein in alignment with the opening in the tubular member and a free end portion extending in spaced relation to said bracket, a screw extending through the opening in said strip and being threaded in said tubular member and having a contact on its opposite end, the free end of said strip being normally biased away from said bracket, and means for adjusting the free end portion of said strip to move said contact to a position in which it is substantially normal to said abutment.

2. An amplifying device as defined in claim 1 in which the bracket extends vertically from its support and including means for setting said abutment in a definite spaced relation to said contact.

3. An amplifying device as defined in claim 1 in which the bracket extends vertically from its support and including means for moving said abutment by increments toward and away from said contact.

4. An amplifying device as defined in claim 1 including a screw threaded through the rigid portion of said casing which is movable into and from said casing to regulate the distance liquid from the casing flows upwardly through said capillary tube.

5. An amplifying device including an abutment, a standard extending upwardly from the abutment, a bracket adjustably mounted on said standard and being settable in a fixed position, a casing having a rigid portion secured to said bracket and a flexible downwardly facing bottom portion, said rigid portion having an opening in its upper wall, a capillary tube having a bore communicating with said casing through said opening and extending upwardly therefrom, means for securing said tube in place, a tubular member having a flange secured to substantially the central portion of the flexible wall of said casing and extending downwardly therefrom, a support secured to one end of the rigid portion of the casing and having an outwardly extending horizontal flange, a resilient strip having one end portion secured to said flange, a portion secured to the free end of said tubular member and having an opening in alignment with the opening in the tubular member, and a free end portion extending in spaced relation to said bracket and being biased therefrom, a screw threaded into said tubular member and having a contact extending downwardly therefrom, and means for adjusting the free end portion of said strip to move said contact to a position in which it is substantially normal to said abutment.

6. An amplifying device as defined in claim 5 in which said screw has a nut thereon for engaging the edge portion of the strip surrounding the opening therein.

7. An amplifying device as defined in claim 5 in which a second standard extends upwardly from said bracket and the capillary tube is in the form of a helix having a bore of uniform diameter throughout its length, the inner portion of which tube is secured to the casing, and means secured to the upper end of the second standard and extending laterally therefrom for supporting the upper end of the capillary tube.

References Cited by the Examiner

UNITED STATES PATENTS

| 1,347,207 | 7/1920 | Coats | 33—172 |
| 1,589,796 | 6/1926 | Eppenstein | 33—147 |
| 1,623,574 | 4/1927 | Bryant | 33—147 |
| 3,031,887 | 5/1962 | Weisend | 73—406 X |

FOREIGN PATENTS

| 116,091 | 10/1942 | Australia. |
| 21,500 | 4/1883 | Germany. |

ISAAC LISANN, *Primary Examiner.*